US012403577B2

(12) United States Patent
Chen

(10) Patent No.: US 12,403,577 B2
(45) Date of Patent: Sep. 2, 2025

(54) STAPLER

(71) Applicant: APEX MFG. CO., LTD., Taichung (TW)

(72) Inventor: Bo-Shun Chen, Taichung (TW)

(73) Assignee: APEX MFG. CO., LTD., Taichung (TW)

( * ) Notice: Subject to any disclaimer, the term of this patent is extended or adjusted under 35 U.S.C. 154(b) by 131 days.

(21) Appl. No.: 18/472,871

(22) Filed: Sep. 22, 2023

(65) Prior Publication Data

US 2025/0100120 A1 Mar. 27, 2025

(51) Int. Cl.
*B25C 5/00* (2006.01)
*B25C 5/11* (2006.01)

(52) U.S. Cl.
CPC .................................... *B25C 5/11* (2013.01)

(58) Field of Classification Search
CPC .... B25C 5/11; B25C 5/06; B25C 1/06; B25C 5/0285; B25C 5/1617
USPC .................... 227/8, 130, 109, 132, 148, 107
See application file for complete search history.

(56) References Cited

U.S. PATENT DOCUMENTS

| | | | | |
|---|---|---|---|---|
| 5,664,722 A * | 9/1997 | Marks | B25C 5/085 227/132 |
| 2008/0156844 A1* | 7/2008 | Braganza | B25C 5/06 227/120 |
| 2008/0223902 A1* | 9/2008 | Tsai | B25C 5/11 227/134 |

FOREIGN PATENT DOCUMENTS

TW I546166 B 8/2016

* cited by examiner

*Primary Examiner* — Jacob A Smith
(74) *Attorney, Agent, or Firm* — Muncy, Geissler, Olds & Lowe, P.C.

(57) ABSTRACT

A stapler is provided, wherein the stapler includes: a main body including a nail outlet, the nail outlet being open toward a nailing direction; a nailing mechanism movably connected to the main body and including a driving unit and a striker movable with the driving unit, the driving unit being configured to drive the striker to move toward the nail outlet in the nailing direction; and a buffering member positioned to the main body, located between the driving unit and the nail outlet in the nailing direction, configured to receive an impact of the driving unit thereon, and including at least one hole.

9 Claims, 8 Drawing Sheets

STAPLER

BACKGROUND OF THE INVENTION

Field of the Invention

The present invention relates to a stapler.

Description of the Prior Art

Generally, a stapler includes an elastic plate, a lever, a hook and a striker installed on the main body. The striker is assembled with the elastic plate and the hook. When the lever is pressed, the lever will drive the elastic plate to deform and the hook still holds the strike plate, thereby storing elastic energy. When the lever is pressed to the nailing position, the lever will drive the hook to separate from the strike plate so that the striker is driven by the elastic plate and strikes the nail to outside. This kind of stapler is like one disclosed in TW I546166.

The stapler in TW 1546166 includes a buffering member to withstand the impact of the elastic plate; however, the structure of the buffering member is too simple and does not provide sufficient buffering ability, resulting in a large scale of impact force of the elastic plate being transmitted to the main body, which can cause the main body to be easily deformed or damaged after long-term use.

The present invention is, therefore, arisen to obviate or at least mitigate the above-mentioned disadvantages.

SUMMARY OF THE INVENTION

The main object of the present invention is to provide a stapler which has better effects of buffering, shock absorption, and sound absorption.

To achieve the above and other objects, a stapler is provided, wherein the stapler includes: a main body including a nail outlet, the nail outlet being open toward a nailing direction; a nailing mechanism movably connected to the main body and including a driving unit and a striker movable with the driving unit, the driving unit being configured to drive the striker to move toward the nail outlet in the nailing direction; and a buffering member positioned to the main body, located between the driving unit and the nail outlet in the nailing direction, configured to receive an impact of the driving unit thereon, and including at least one hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
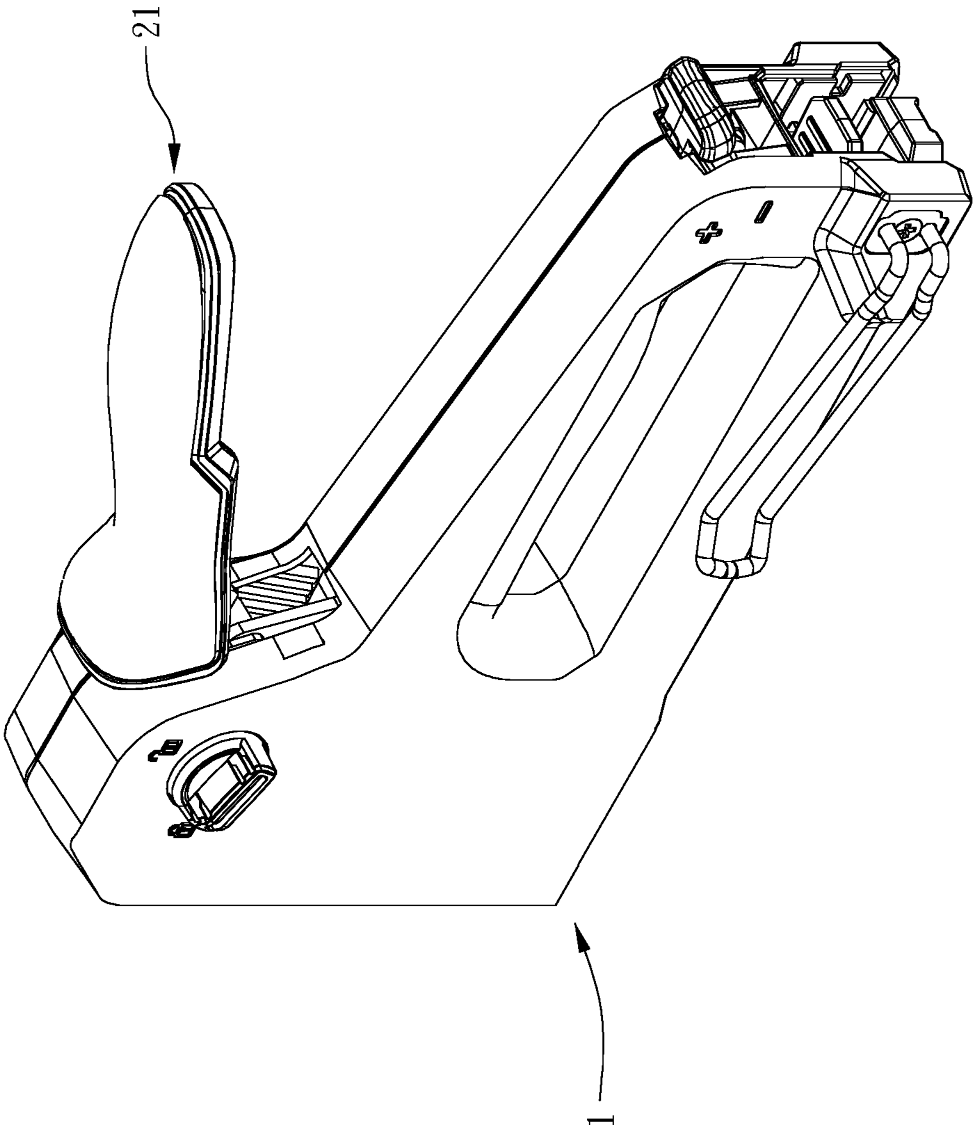
FIG. 1 is a stereogram of an exemplary embodiment of the present invention.
Figure 2:
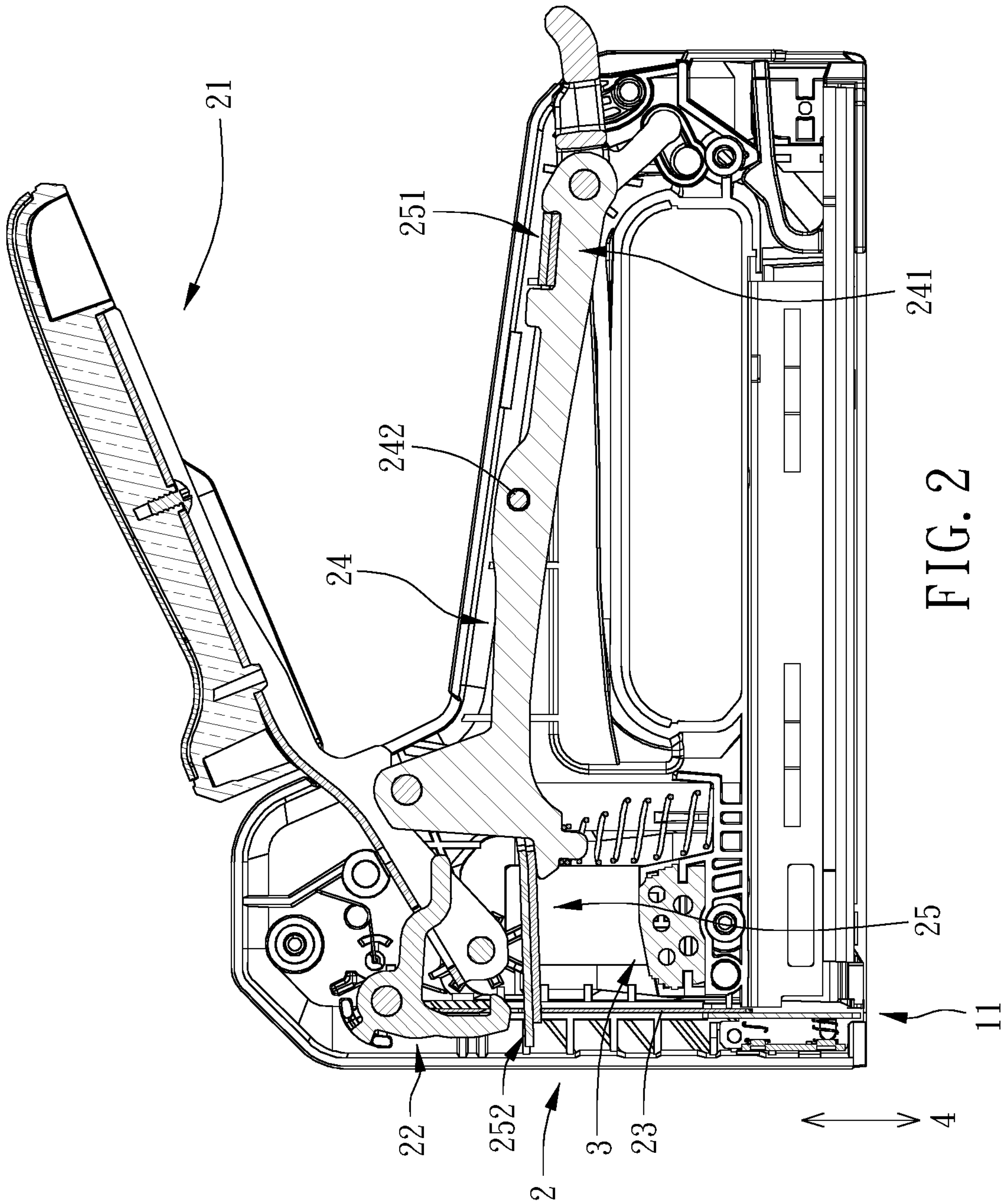
FIG. 2 is a cross-sectional view of a stapler under a condition that an operation member is located in a first position according to an exemplary embodiment of the present invention.
Figure 3:
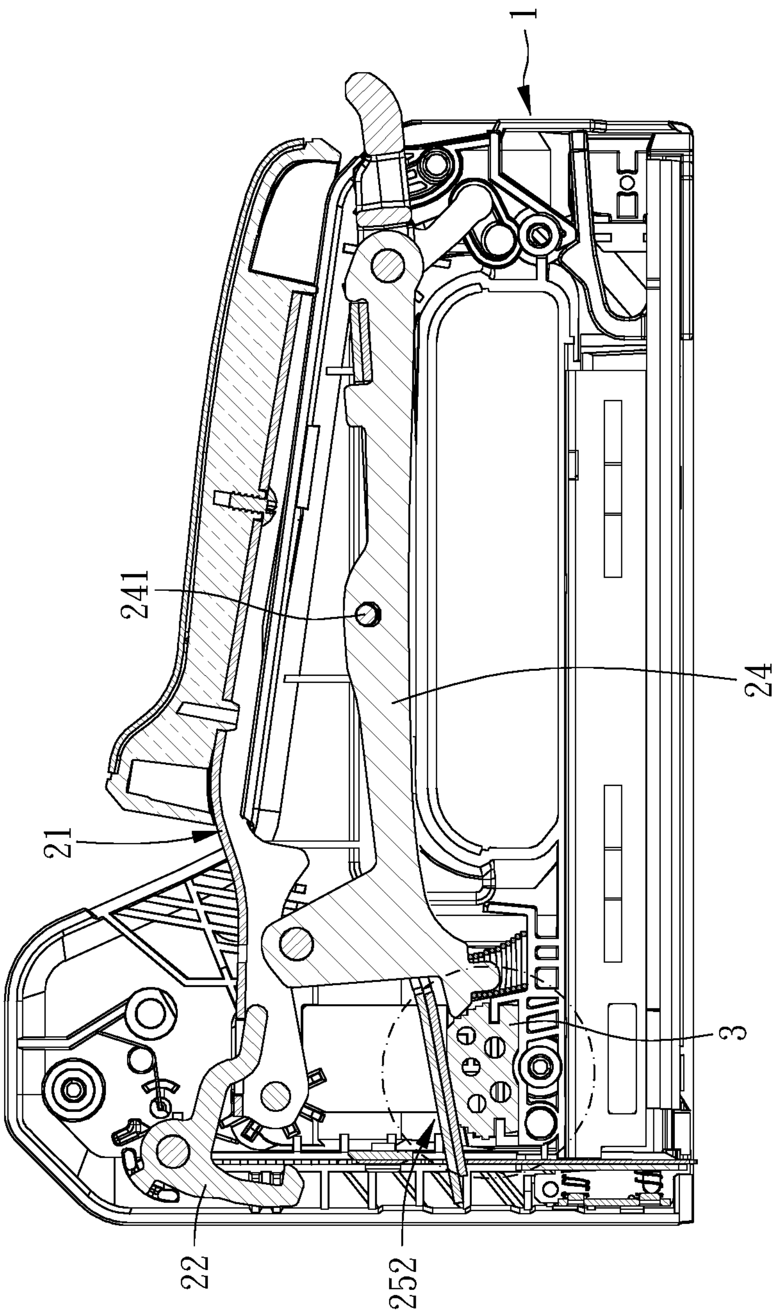
FIG. 3 is a cross-sectional view of the stapler under a condition that the operation member is located in a second position according to an exemplary embodiment of the present invention.
Figure 4:
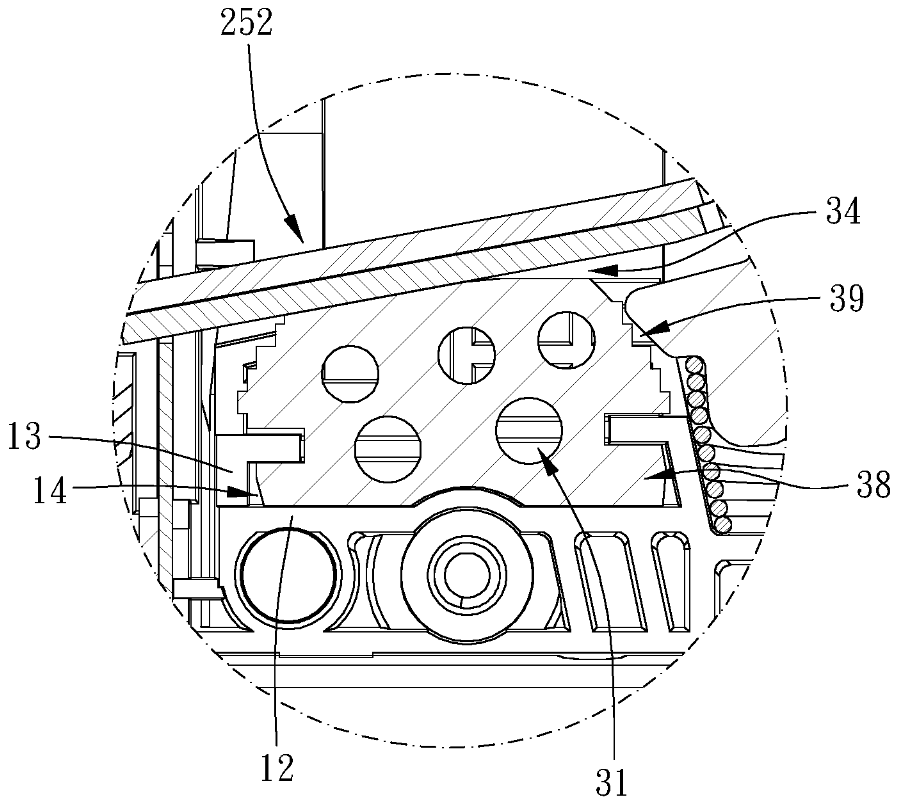
FIG. 4 is a partial enlargement of FIG. 3.
Figure 5:
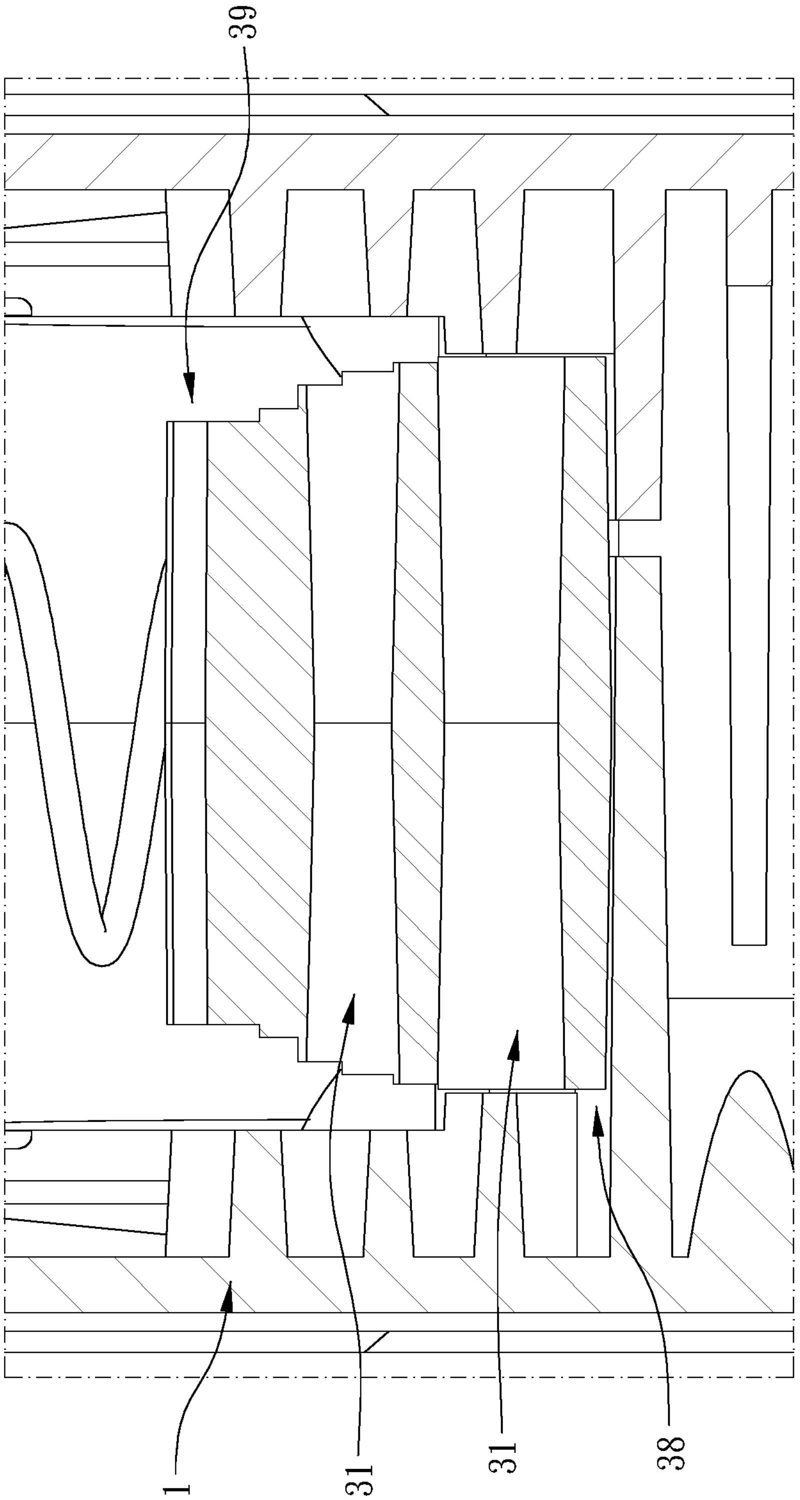
FIG. 5 is a partial cross-sectional view of an exemplary embodiment of the present invention.
Figure 6:
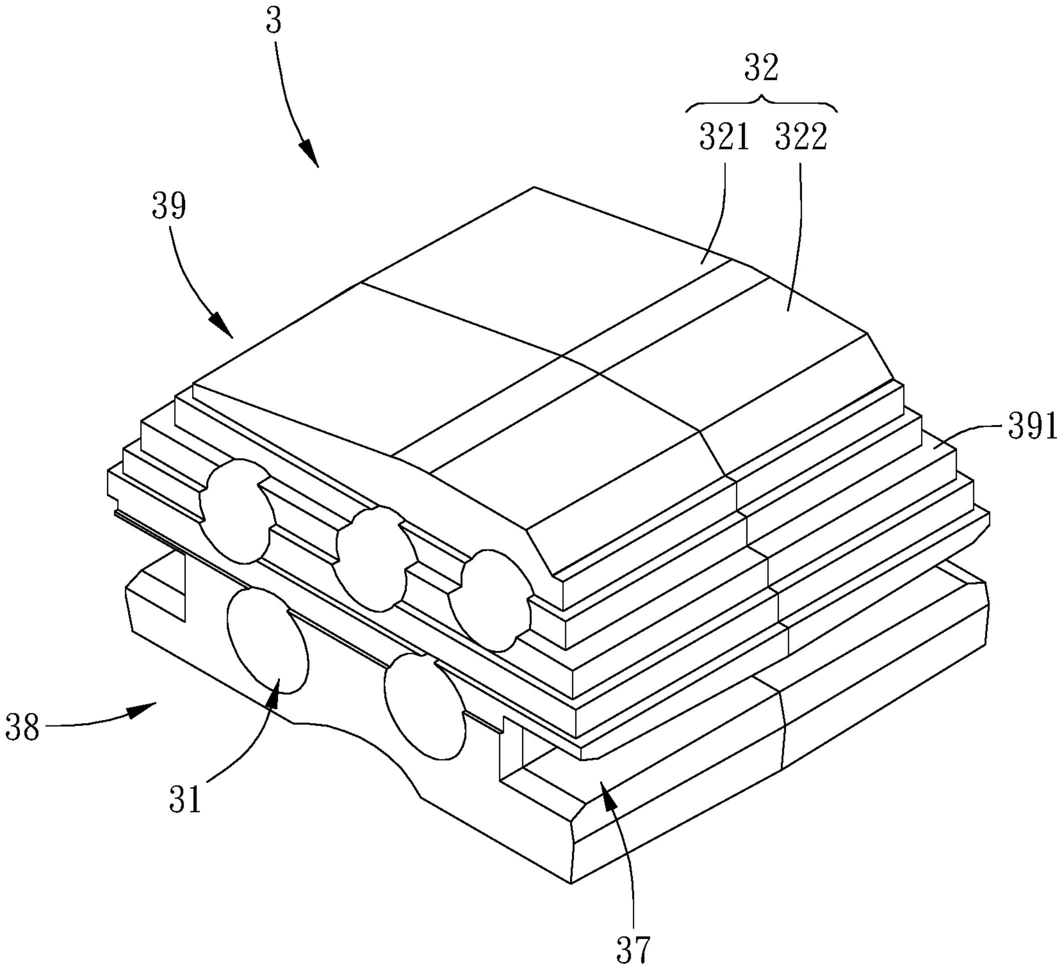
FIG. 6 is a stereogram of a buffering member of an exemplary embodiment of the present invention.
Figure 7:
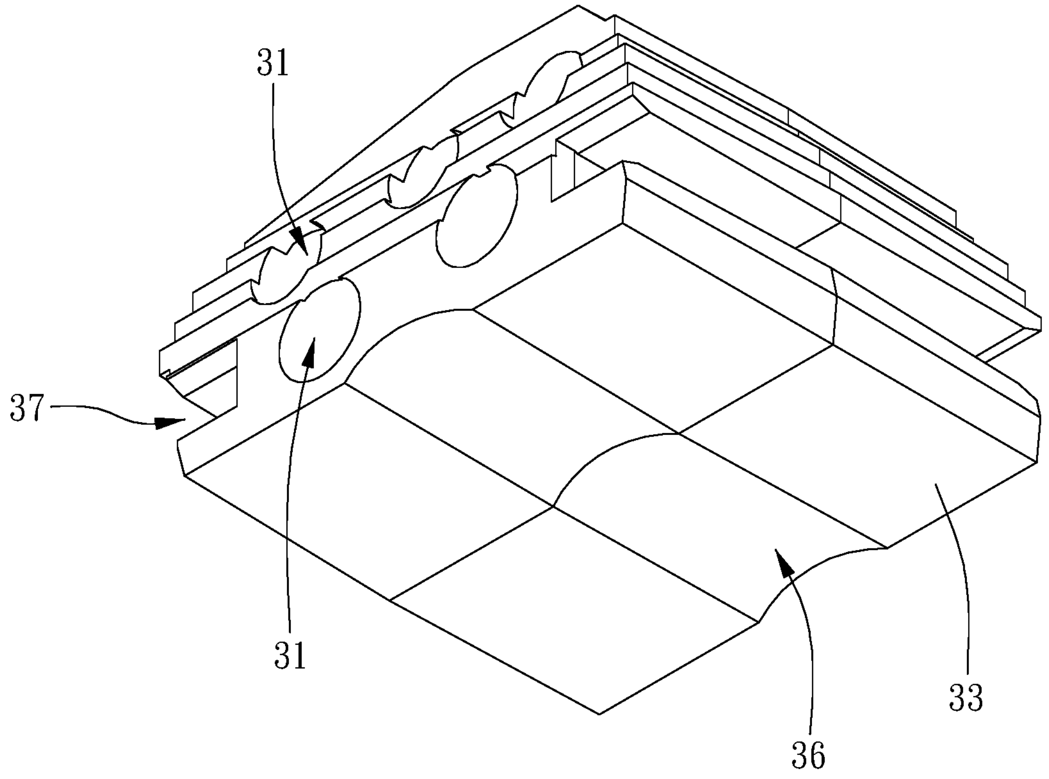
FIG. 7 is another stereogram of the buffering member of an exemplary embodiment of the present invention.
Figure 8:
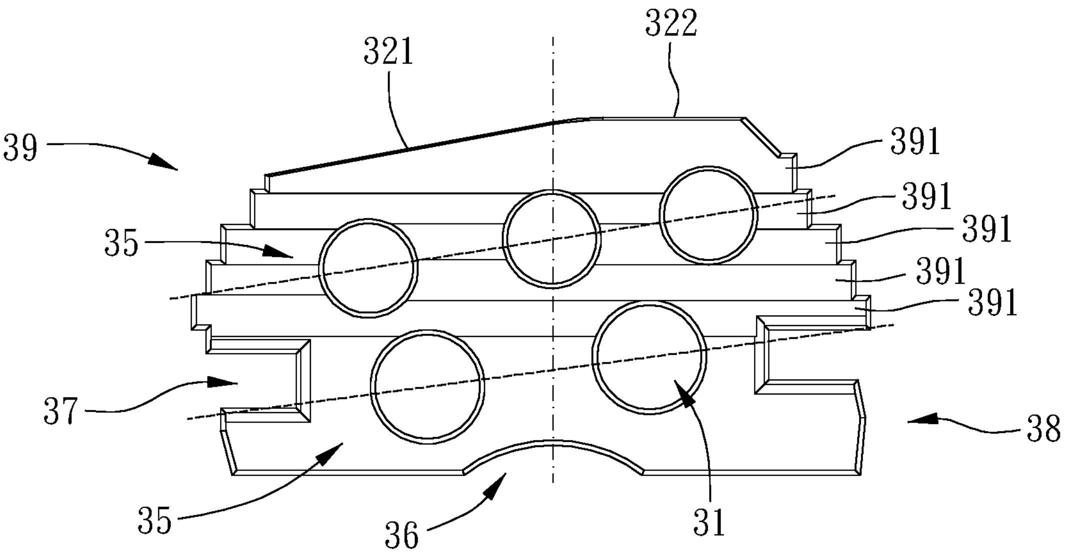
FIG. 8 is a front view of FIG. 6.
Figure 9:
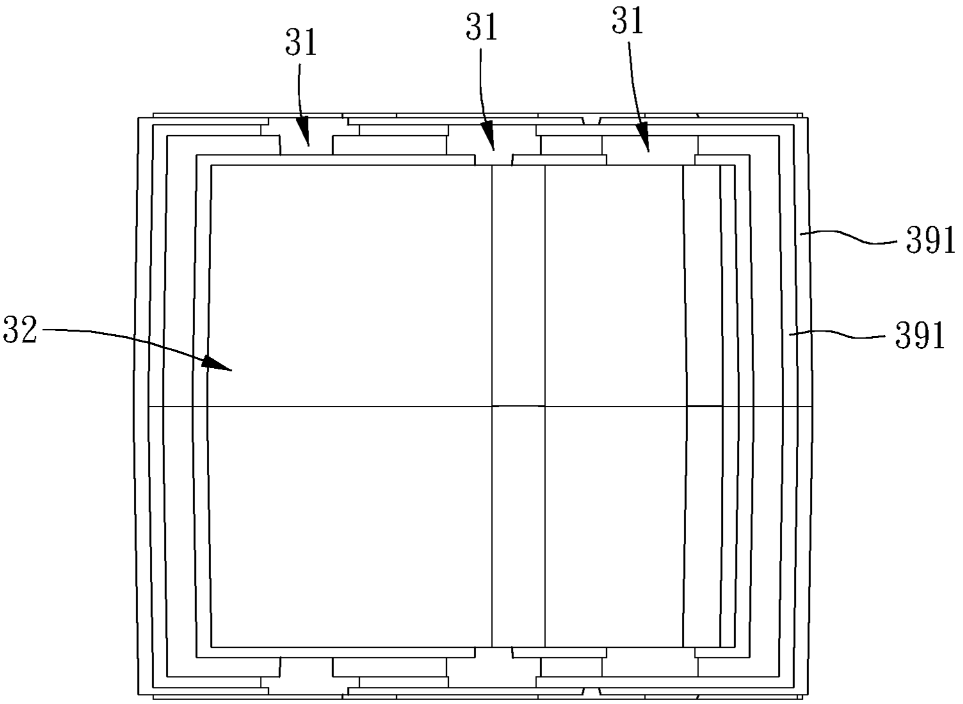
FIG. 9 is a top view of FIG. 6.

Please refer to FIGS. 1 to 9 for an exemplary embodiment of the present invention. A stapler of the present invention includes a main body 1, a nailing mechanism 2 and a buffering member 3.

The main body 1 includes a nail outlet 11, and the nail outlet 11 is open toward a nailing direction 4. The nailing mechanism 2 is movably connected to the main body 1, the nailing mechanism 2 includes a driving unit and a striker 23 movable with the driving unit, and the driving unit is configured to drive the striker 23 to move toward the nail outlet 11 in the nailing direction 4.

The buffering member 3 is positioned to the main body 1, the buffering member is located between the driving unit and the nail outlet 11 3 in the nailing direction 4, the buffering member 3 is configured to receive an impact of the driving unit thereon, and the buffering member 3 includes at least one hole 31 extending transverse to the nail outlet 11. The at least one hole 31 provides the margin space required for the buffering member 3 to deform, so that the buffering member 3 can partially deform after being stressed, and can have better effects of buffering, shock absorption, and sound absorption. As such, the impact force on the buffering member 3 caused by the driving unit will not be transmitted to the main body 1, thereby protecting the main body 1, prolonging the service life of the stapler, and reducing the sound when nailing.

Specifically, the driving unit further includes an operation member 21, a hook member 22, a forcing member 24 and an elastic member 25, the operation member 21 is disposed on the main body 1 and movable between a first position and a second position, the hook member 22 is movably disposed on the main body 1 and configured to hook the striker 23, the striker 23 is disposed on the main body 1 and movable in the nailing direction 4 relative to the nail outlet 11, the forcing member 24 is rotatably connected to the main body 1 and movable with the operation member 21, the forcing member 24 includes an abutting portion 241 and a pressing portion 242, a first end portion 251 of the elastic member 25 is positioned to the abutting portion 241, and a second end portion 252 of the elastic member 25 is inserted in and connected to the striker 23. When the operation member 21 is located in the first position, the hook member 22 hooks the striker 23 so that the striker 23 is kept in position; when the operation member 21 is driven to move from the first position toward the second position, the operation member 21 moves to drive the forcing member 24 so that the pressing portion 242 presses the elastic member 25 to deform; and when the operation member 21 is located in the second position, the operation member 21 drives the hook member 22 to release the striker 23, the second end portion 252 of the elastic member 25 swings to drive the striker 23 to move toward the nail outlet 11 so that the second end portion 252 of the elastic member 25 impacts on the buffering member 3.

The buffering member 3 includes a top portion 32 and a bottom portion 33 opposite to each other, and the top portion 32 faces the driving unit. The at least one hole 31 is configured to be not through at least one of the top portion 32 and the bottom portion 33, which ensure the integrity of the contact area of the top portion 32 and the elastic member 25 of the driving unit, and the integrity of the contact area of the bottom portion 33 and the main body 1.

Specifically, the top portion 32 includes a first surface 321 and a second surface 322 obliquely connected to each other, and the first surface 321 is more adjacent to the striker 23 than the second surface 32. When the elastic member 25 of the driving unit impacts the buffering member 3, the elastic member 25 of the driving unit is abutted against the first surface 321, and there is a gap 34 between the second surface 322 and the elastic member 25 of the driving unit, the gap 34 provides the margin space for the deformation of the second surface 322.

Specifically, the area of the first surface 321 is larger than the area of the second surface 322, providing a large contact area of the first surface 321 and the second end portion 252. The first surface 321 and the second surface 322 extend away from each other, and the first surface 321 extends obliquely relative to the bottom portion 33 and gradually close to the striker 23. The first surface 321 is inclined to the nailing direction 4, the second surface 322 is perpendicular to the nailing direction 4, and an included angle between the first surface 321 and the second surface 322 ranges from 160 degrees to 175 degrees.

In this embodiment, the at least one hole includes a plurality of holes 31 arranged in at least one row 35 which is arranged in interval along a direction parallel to the first surface 321 so that the buffering member 3 can deform at different positions. The hole 31 is circular. At least one of the plurality of holes 31 adjacent to the top portion 32 has a diametric dimension smaller than a diametric dimension of at least one of the plurality of holes 31 adjacent to the bottom portion 33, which ensures that the structure of the buffering member 3 near the top portion 32 has better structural strength to withstand the impacts.

Preferably, the buffering member 3 further includes a concave portion 36 disposed on the bottom portion 33, which provides good effective buffer of the buffering member 3. When the elastic member 25 impacts on the top portion 32, the bottom portion 33 can respond to deformation more quickly. In this embodiment, the concave portion 36 linearly extends at the central region of the bottom portion 33 so that the buffering member 3 is more likely to deform and sink in the center, allowing the force to be evenly dispersed outward from the center portion of the buffering member 3.

The main body 1 further includes a supporting portion 12 and two restriction portions 13, and the two restriction portions 13 are separate from each other and protrusive from the supporting portion 12 to define a receiving space 14. The buffering member 3 further includes two slots 37, and the two slots 37 receive the two restriction portions 13. A portion of the buffering member 3 received in the receiving space 14 is defined as a first portion 38, a portion of the buffering member 3 protrusive beyond the receiving space 14 is defined as a second portion 39, and the elastic member 25 of the driving unit is abuttable against the second portion 39. The second portion 39 includes a plurality of staged portions 391, the plurality of staged portions 391 are tapered in a direction away from the first portion 38 so that lateral sides of the second portion 39 are stepped. When the second end portion 252 impacts the staged portion 391 at the top, the force will be transmitted in the direction toward the first portion 38 and spread to other staged portions 391 to disperse the stress.

In this embodiment, each of the plurality of staged portions 391 is rectangular, the plurality of staged portions 391 are arranged concentrically, and each of the two slots 37 is parallel to the plurality of holes 31. In the nailing direction 4, one of the two slots 37 adjacent to the striker 23 has a dimension larger than a dimension of associated one of the two restriction portions 13, so that the second portion 39 can shake relative to the two restriction portions 13 after being impacted by the second end portion 252, thereby buffering the impact force. In a direction perpendicular to the nailing direction 4, two sides of the second portion 39 are distanced from the main body 1, respectively, so that the second portion 39 cannot contact the main body 1 when it is compressed to deform in a direction perpendicular to the nailing direction 4, protecting the main body 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A stapler including:

a main body including a nail outlet, the nail outlet being open toward a nailing direction;

a nailing mechanism movably connected to the main body and including a driving unit and a striker movable with the driving unit, the driving unit being configured to drive the striker to move toward the nail outlet in the nailing direction; and a buffering member positioned to the main body, located between the driving unit and the nail outlet in the nailing direction, configured to receive an impact of the driving unit thereon, and including at least one hole, wherein the at least one hole extends transverse to the nail outlet, the buffering member further includes a top portion and a bottom portion opposite to each other, the top portion faces the driving unit, and the at least one hole is configured to be not through at least one of the top portion and the bottom portion.

2. The stapler of claim 1, wherein the main body further includes a supporting portion and two restriction portions, the two restriction portions are separate from each other and protrusive from the supporting portion to define a receiving space, the buffering member further includes two slots, the two slots receive the two restriction portions, a portion of the buffering member received in the receiving space is defined as a first portion, a portion of the buffering member protrusive beyond the receiving space is defined as a second portion, the driving unit is abuttable against the second portion, the second portion includes a plurality of staged portions, and the plurality of staged portions are tapered in a direction away from the first portion so that lateral sides of the second portion are stepped.

3. The stapler of claim 2, wherein in a direction perpendicular to the nailing direction two sides of the second portion are distanced from the main body, respectively.

4. A stapler including:

a main body including a nail outlet, the nail outlet being open toward a nailing direction;

a nailing mechanism movably connected to the main body and including a driving unit and a striker movable with the driving unit, the driving unit being configured to drive the striker to move toward the nail outlet in the nailing direction; and a buffering member positioned to the main body, located between the driving unit and the nail outlet in the nailing direction, configured to receive an impact of the driving unit thereon, and including at least one hole, wherein the buffering member further includes a top portion and a bottom portion opposite to each other, the top portion faces the driving unit, the top portion includes a first surface and a second surface obliquely connected to each other, the first surface is more adjacent to the striker than the second surface, and when the driving unit impacts the buffering member, the driving unit is abutted against the first surface and there is a gap between the second surface and the driving unit.

5. The stapler of claim 4, wherein the first surface and the second surface extend away from each other, and the first surface extends obliquely relative to the bottom portion and gradually close to the striker.

6. The stapler of claim 5, wherein the at least one hole is configured to be not through at least one of the top portion and the bottom portion; the at least one hole includes a plurality of holes arranged in at least one row which is arranged in interval along a direction parallel to the first surface; at least one of the plurality of holes adjacent to the top portion has a diametric dimension smaller than a diametric dimension of at least one of the plurality of holes adjacent to the bottom portion; the buffering member further includes a concave portion disposed on the bottom portion; the main body further includes a supporting portion and two restriction portions, the two restriction portions are separate from each other and protrusive from the supporting portion to define a receiving space, the buffering member further includes two slots, the two slots receive the two restriction portions, a portion of the buffering member received in the receiving space is defined as a first portion, a portion of the buffering member protrusive beyond the receiving space is defined as a second portion, the driving unit is abuttable against the second portion, the second portion includes a plurality of staged portions, and the plurality of staged portions are tapered in a direction away from the first portion so that lateral sides of the second portion are stepped; in a direction perpendicular to the nailing direction two sides of the second portion are distanced from the main body, respectively; the area of the first surface is larger than the area of the second surface, the first surface is inclined relative to the nailing direction, the second surface is perpendicular to the nailing direction, and an included angle between the first surface and the second surface ranges from 160 degrees to 175 degrees; the concave portion linearly extends at the central region of the bottom portion; each of the two slots is parallel to the plurality of holes; in the nailing direction one of the two slots adjacent to the striker has a dimension larger than a dimension of associated one of the two restriction portions; each of the plurality of staged portions is rectangular; the hole is circular; the driving unit further includes an operation member, a hook member, a forcing member and an elastic member, the operation member is disposed on the main body and movable between a first position and a second position, the hook member is movably disposed on the main body and configured to hook the striker, the forcing member is rotatably connected to the main body and movable with the operation member, the forcing member includes an abutting portion and a pressing portion, a first end portion of the elastic member is positioned to the abutting portion, a second end portion of the elastic member is inserted in and connected to the striker, when the operation member is located in the first position, the hook member hooks the striker so that the striker is kept in position, when the operation member is driven to move from the first position toward the second position, the operation member moves to drive the forcing member so that the pressing portion presses the elastic member to deform, and when the operation member is located in the second position, the operation member drives the hook member to release the striker, the second end portion of the elastic member swings to drive the striker to move toward the nail outlet so that the second end portion of the elastic member impacts on the buffering member.

7. The stapler of claim 4, wherein the at least one hole includes a plurality of holes arranged in at least one row which is arranged in interval along a direction parallel to the first surface.

8. The stapler of claim 4, wherein the at least one hole includes a plurality of holes, and at least one of the plurality of holes adjacent to the top portion has a diametric dimension is smaller than a diametric dimension at least one of the plurality of holes adjacent to the bottom portion.

9. The stapler of claim 4, wherein the buffering member further includes a concave portion disposed on the bottom portion.

* * * * *